(12) United States Patent
Kashiwazaki

(10) Patent No.: US 6,570,605 B1
(45) Date of Patent: May 27, 2003

(54) PRINT CONTROL APPARATUS AND PRINT CONTROL METHOD CAPABLE OF INTERRUPTION PRINTING

(75) Inventor: Masami Kashiwazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,550

(22) Filed: May 19, 2000

(30) Foreign Application Priority Data

May 20, 1999 (JP) ............................... 11-139625
May 17, 2000 (JP) ........................... 2000-144998

(51) Int. Cl.$^7$ ................................................. B41J 2/435
(52) U.S. Cl. ....................................................... 347/264
(58) Field of Search .................................. 347/262, 264; 358/1.15, 1.13; 399/84, 87, 405, 407, 82, 77, 81; 701/36; 270/58.02

(56) References Cited

U.S. PATENT DOCUMENTS

| 5,243,381 | A | * | 9/1993 | Hube ........................... 399/84 |
| 5,781,706 | A | | 7/1998 | Kashiwazaki ............... 358/1.1 |
| 5,940,582 | A | * | 8/1999 | Akabori et al. ............ 358/1.13 |
| 6,184,996 | B1 | * | 2/2001 | Gase ........................... 358/1.15 |
| 6,188,939 | B1 | * | 2/2001 | Morgan et al. ............... 701/36 |
| 6,279,892 | B1 | * | 8/2001 | Yoshida et al. .......... 270/58.02 |
| 6,219,502 | B1 | * | 4/2002 | Osari et al. .................... 399/82 |

* cited by examiner

Primary Examiner—Hai Pham
(74) Attorney, Agent, or Firm—Fitzpatrick, Cella, Harper & Scinto

(57) ABSTRACT

There is provided a print control method in which the user, in designating an interruption printing from the host computer, can change the sheet discharge method and the sheet discharge unit for a print job designated for interruption printing, so that the prints of the interruption print job are not mixed with the prints of other print jobs.

30 Claims, 10 Drawing Sheets

FIG. 8

MEMORY MAP OF MEM MEDIUM
(FD/CD-ROM, ETC.)

| DIRECTORY |
|---|
| PROGRAM CODES FOR FLOWCHART OF FIG. 6 |
| |

PRINT CONTROL APPARATUS AND PRINT CONTROL METHOD CAPABLE OF INTERRUPTION PRINTING

BACKGROUND OF THE INVENTION

1. Field of the Invention

The present invention relates to a print control apparatus capable of analyzing a print job received from an upper apparatus and generating print data suitable for printing, a print control method therefor, a computer-readable memory medium storing a program for such print control method and such print control program.

2. Related Background Art

Conventionally, the print job supplied from a host computer to a printer has been outputted by the printer in the received order. The printer has been incapable of changing afterwards the order of output of the print jobs or outputting another print job by interrupting the job in current printing operation.

With the recent popularization of networks, the printing operation through a network is becoming common. In such environment, plural users common by use a printer. Therefore, while a user is outputting a print job of a large amount by a printer, if another user wishes to output a print job with such printer, such another user has to wait for a long time until the print output can be obtained. Such long wait constitutes a serious problem if such another user needs the printout urgently.

Also, in case such another user sends the print job to the printer through the network, there is required a useless work of visiting the printer in a distant location repeatedly in order to check the progress of the printing work.

SUMMARY OF THE INVENTION

As explained above, the mere improvement in the print process speed cannot flexibly adapt to the print requests from plural users, thereby incapable of attaining the customer satisfaction.

In order to resolve the above-mentioned drawback, the present invention executes, in accumulating the print jobs received from an external apparatus and processing such print jobs in succession, such control, based on an entered instruction, as to execute the output of an instructed print job by interrupting the execution of any of the print jobs and inserting the process of the instructed print job. Thus the user can arbitrarily change the order of output of plural print jobs by a simple instructing operation and the printing apparatus can promptly and flexibly adapt to the print requests from the plural users.

Also, in designating an interruption printing from the host computer, the user can change the sheet discharging method and the sheet discharging unit for the designated interruption printing, so that the prints obtained in the interruption print job can be prevented from mixed stacking with the prints of other print jobs.

Also, when visiting the printer for taking the prints belonging to the user, the user can execute the interruption printing by informing the printer of the ID of the user through an operation panel, a magnetic card reader or a bar code reader of the printer, so that the user is not required to return to the host computer in order to achieve the interruption printing.

BRIEF DESCRIPTION OF THE DRAWINGS

FIG. 8 is a view showing a memory map of a memory medium storing various data processing programs that can be read by a print system in which the print control apparatus of the present invention is applicable.

DESCRIPTION OF THE PREFERRED EMBODIMENTS

In the following, the present invention will be clarified in detail by preferred embodiments thereof, with reference to accompanying drawings.

<Laser Beam Printer>

Figure 1:
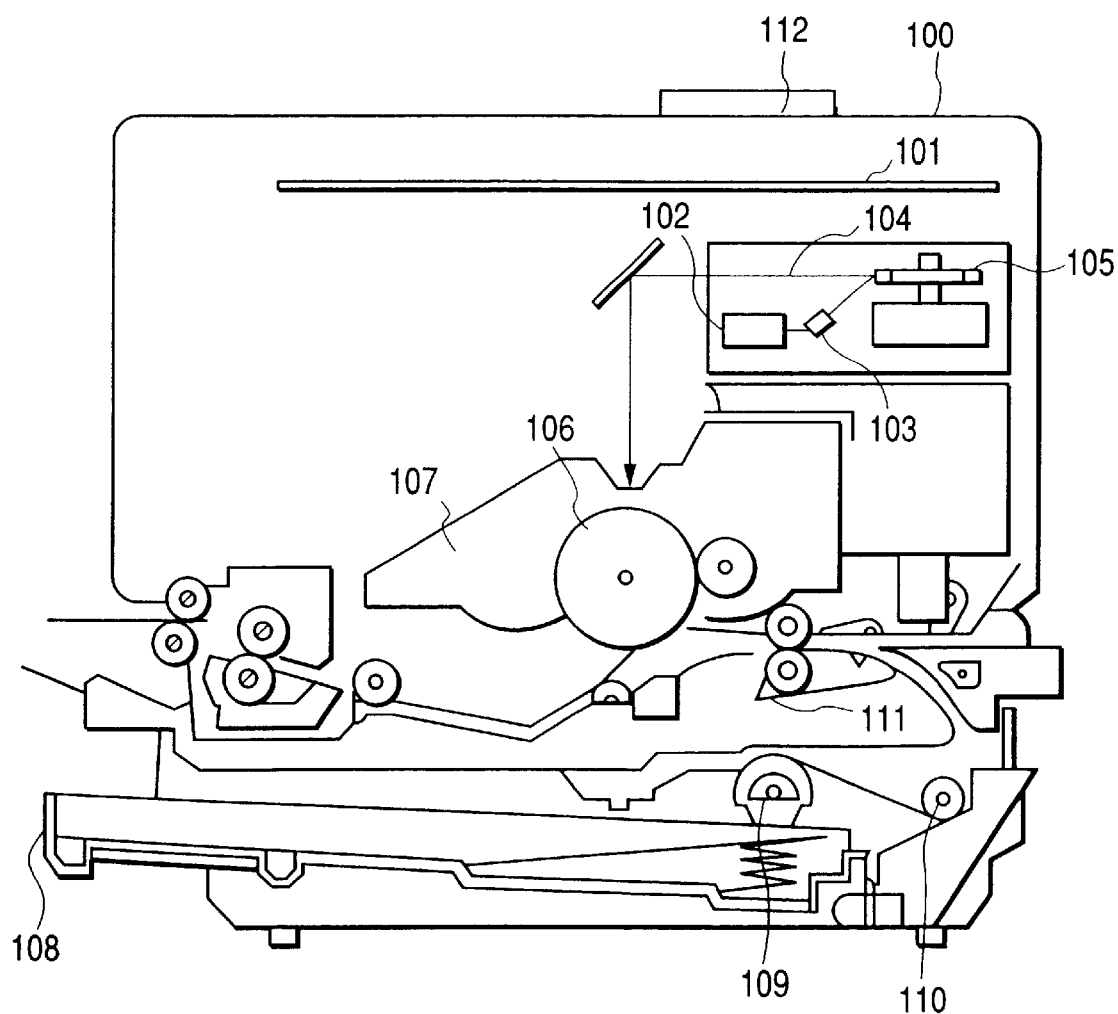
FIG. 1 is a cross-sectional view showing the configuration of a printer in which the present invention is applicable.

FIG. 1 is a cross-sectional view of a laser beam printer (LBP) in which the present invention is advantageously applicable. However, the present invention may be applied not only to the laser beam printer but also the printer of any other printing method.

Referring to FIG. 1, a main body 100 of the LBP (hereinafter simply written as printer) receives and analyzes PDL data or job control data from an externally connected host computer 200 (FIG. 2), then executes dip map development based on such data, further converts the bit map data into video data (video signal) and forms an image on a recording sheet based on the video data.

An operation panel 112 is provided with switches, LED, LCD, magnetic card reader, bar code reader etc. for operations by the user.

A printer controller 101 processes the PDL data and job control data supplied from the host computer 200. The printer controller 101 converts the entered PDL data into a video signal, and sends such video signal to a laser driver 102. It also informs the host computer 200 of various status of the printer. Also according to the entered job control data, it interrupts the job in current printing, or executes a print job which is already received or is to be received in preference for the print job in current processing, or changes the order to output of the print jobs held in the printer.

A laser driver 102 drives a semiconductor laser 103 and on-off switches a laser beam 104 emitted from the semiconductor laser 103 according to the entered video signal. The laser beam 104 is deflected in the lateral direction by a rotary polygon mirror 105 and scans an electrostatic drum 106, whereby an electrostatic latent image of a character pattern or a graphic pattern thereon. The latent image is developed by a developing unit 107 provided around the electrostatic drum 106 and is then transferred onto a recording sheet.

The recording sheet is composed of a cut sheet, which is contained in a sheet cassette 108 mounted on the printer 100, and is fetched into the apparatus and fed to the electrostatic drum 106 by a feed roller 109, and conveying rollers 110, 111.

<Control Configuration of Printer System>

Figure 2:
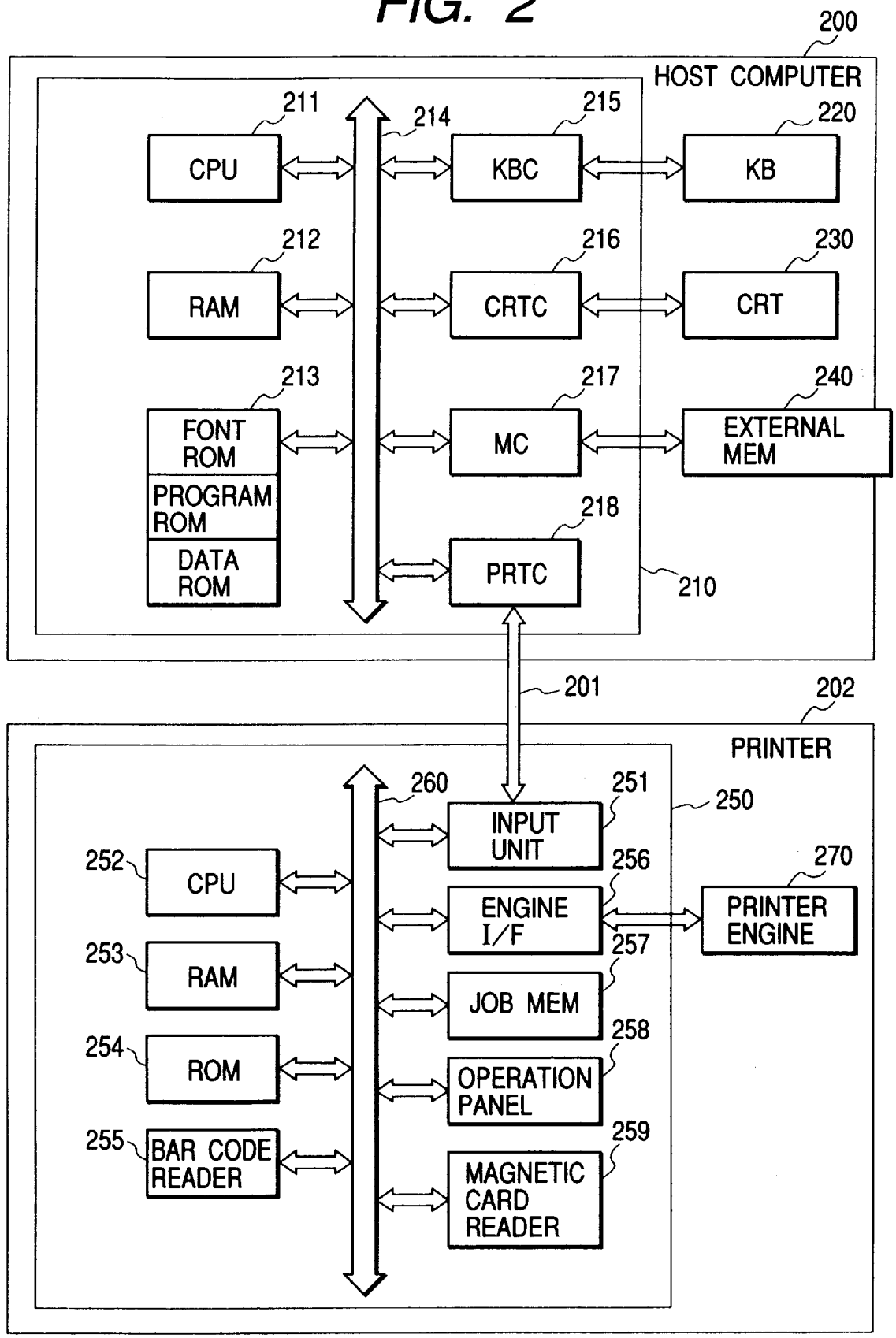
FIG. 2 is a block diagram showing an example of the configuration of a printer control system.

FIG. 2 is a block diagram showing the control configuration of a printer system, composed of a host computer and a printer of the present invention. The printer system of the present invention may be a system consisting of a single equipment, a system consisting of plural equipment or a system in which the process is executed through a network such as a LAN.

In FIG. 2, there are shown a host computer 200, and a CPU 211 for processing a document containing a pattern, an image, a character, a table (including table calculation) etc. according to a document processing program stored in a program ROM of a ROM 213. The CPU 211 also integrally controls the devices connected to a system bus 214.

A ROM 213 is composed of a program ROM, a font ROM and a data ROM. The program ROM stores the control program for the CPU 1. The font ROM stores the font data to be used in the document processing. The data ROM stores various data to e used in the document processing mentioned above.

A RAM 212 functions as a main memory and a work area of the CPU 1.

A keyboard controller (KBC) 215 controls the key input from a keyboard (KB) 220 and an unrepresented pointing device. A CRT controller (CRTC) 216 controls the display on a CRT display (CRT) 230.

A memory controller (MC) 217 controls access to an external memory 240 such as a hard disk (HD) or a floppy disk (FD). The HD or FD stores a boot program, various applications, font data, user files, editing files etc.

A printer controller (PRTC) 218 is connected to a printer 202 through a predetermined bidirectional interface 201, thereby controlling the communication with the printer 202. If the print information is outputted to a network printer, a network I/F card (NIC) is used as the PRTC 218.

The CPU 211 executes development (rasterization) process of the outline font in a display information RAM provided for example in the RAM 212, thereby realizing WYSIWYG on the CRT 230. Also the CPU 211 opens various registered windows and executes various data processings based on commands instructed by an unrepresented mouse cursor displayed on the CRT 302.

A printer CPU 252 integrally controls various devices connected to a system bus 260 based on a control program stored in a ROM 255. The CPU 252 also sends image information (video data) to a printer engine 270 connected through an engine interface 256.

The CPU 252 is capable of communication with the host computer through an input unit 251. The information in the printer 202 can be transferred to the host computer 200.

Figure 3:
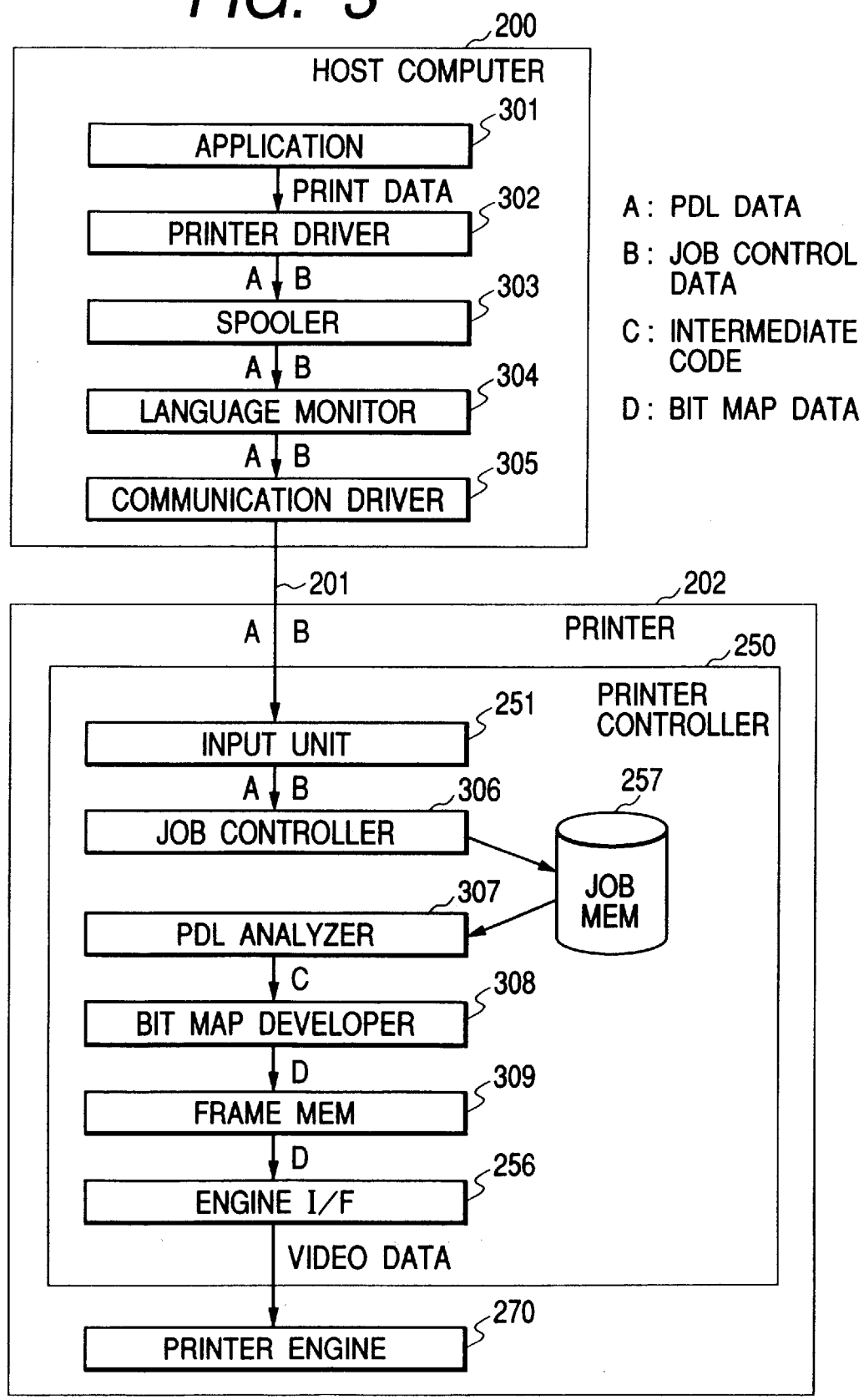
FIG. 3 is a block diagram for explaining the data processing function of a host computer and a printer in the printer control system shown in FIG. 2.

A RAM 253 functions for example as a frame memory 309 (FIG. 3). The frame memory 309 stores bit map data developed by a bit map developer 308 (FIG. 3).

A job memory 257 temporarily stores the entered PDL data, and is composed for example of a RAM or a hard disk. The engine interface 256 receives the bit map data from the frame memory 309 and converts such bit map data into video data for supply to the printer engine 270.

The aforementioned operation panel 258 is provided with switches, LED, LCD, a magnetic card reader 259, a bar code reader 255 etc. for various operations. The user of the printer has a magnetic card, storing the ID of the owner. The user can inform the printer 202 of the owner ID of the print job to be executed by interruption, by passing such magnetic card through the magnetic card reader 259.

Also the user of the printer has a card bearing a bar code of the owner ID. The user can inform the printer 202 of the owner ID of the print job to be executed by interruption, by causing the bar code reader 255 to read the bar code.

<Functional Configuration of Printer System>

FIG. 3 is a block diagram showing the functional configuration of the host computer 200 and the printer 200 in the printer system shown in FIG. 2, wherein components same as those in FIG. 2 are represented by same numbers.

In FIG. 3, the host computer 200 and the printer 202 are connected through a bidirectional interface 201 (printer cable or network cable). In case of a network cable, there are omitted various connection devices present between the host computer and the printer.

An application program 301, a printer driver 302, a spooler 303, a language monitor 304 and a communication driver 305 are programs functioning on the host computer 200.

The printer 201 is composed of a printer controller 250 and a printer engine 270. The printer controller 250 is composed of an input unit 251, a job controller 306, a job memory 257, a PDL analyzer 307, a bit map developer 308, a frame memory 309 and a printer I/F 256, and the job memory 257 is composed for example of a hard disk or a RAM.

The user of the host computer 200 and the printer 202 executes a printing operation by operating the application program 301. The print data outputted from the application program 301 are converted in the printer driver 302 into PDL data A that can be interpreted by the printer 202, and job control data B. The PDL data A and the job control data B are supplied to the spooler 303, which temporarily stores the PDL data A and the job control data B in a file, and then reads and sends the PDL data A and the job control data B to the language monitor 304.

The language monitor 304 transfers the received PDL data A and job control data B to a communication driver 305, which transmits the PDL data A and the job control data B to the printer 202 through a printer cable or a network cable.

The PDL data A and the job control data B, transferred from the host computer 200 to the printer 202, are further transferred through the input unit 251 to the job controller 306. The job controller 306 analyzes the job control data thereby executing a process according to the content of the received job control data, and also stores the PDL data A in the job memory 257.

The PDL data A stored in the job memory 257 are read by the PDL analyzer 307 basically according to the order of storage (order of reception), and the PDL analyzer 307 analyzes the PDL data A to generate an intermediate code C, which is data of a format suitable for bit map development by the bit map developer 308.

The intermediate code C, generated by the PDL analyzer 307, is bit map developed in the bit map developer unit 308, and the resulting bit map data D are stored in the frame memory 309. The engine I/F 256 sends the video data to the printer engine 270 according to the bit map data D stored in the frame memory 309. As a result, for example the laser beam is on-off controlled to record the print result (image) on the recording medium such as paper.

<Job Control Data>

The job control data processed in the job controller 308 for example include data (1) to (8) of eight kinds to be explained in the following. Also in the host computer 200, the preparation of the job control data B is not limited to the printer driver 302 but the job control data B may naturally be prepared also by various utility softwares and transmitted to the printer 202.

The job control data (1) are a "job interruption print command", which interrupts the job in current printing at a suitable partition and executes the printing operation preferentially of a designated job among the print jobs stored in the job memory 257 (interruption printing).

The job control data (2) are a "job schedule change command", which changes the order of printing of a designated printing job among the print jobs stored in the job memory 257.

The job control data (3) are a "job attribute correction command", which corrects the attribute (for example number of copies) of a designated print job among the print jobs stored in the job memory 257.

The job control data (4) are a "job suspend/resume command", which suspends the printing of a designated print job among the print jobs stored in the job memory 257 or resumes the printing of the print job in the suspended state.

The job control data (5) are a "job store command", which does not execute the printing operation of a designated print job among the print jobs stored in the job memory 257 and stores such designated print job in the job memory 257.

The job control data (6) are a "job print command", which executes the printing of a print job stored by the job store command, among the print jobs stored in the job memory 257. In such case, the print job, after printed by this command, is not automatically deleted from the job memory 257.

The job control data (7) are a "job cancel command", which deletes, from the job memory 257, a designated print job among the print jobs stored in the job memory 257.

Figure 4:
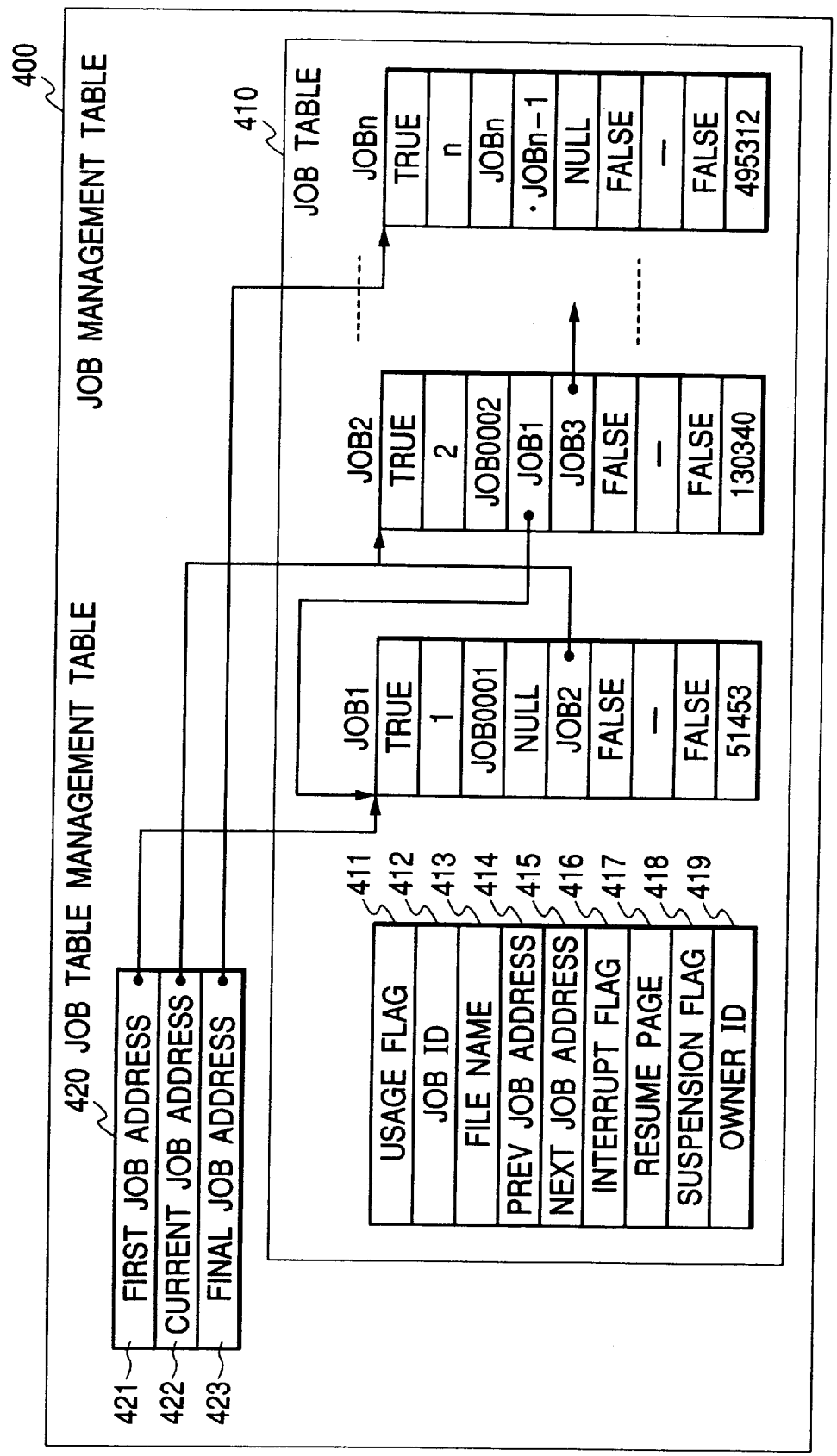
FIG. 4 is a view showing an example of a job management table for job management in a job controller shown in FIG. 3.

The job control data (8) are a "job owner ID notice command", which notifies the owner ID of a designated print job from the host computer 200 to the printer 200. The information in this command is written in an owner ID column in a job table 410 (FIG. 4).

<Process of Job Controller>

In the following there will be given a detailed explanation on the process in the job controller 306 shown in FIG. 3. FIG. 4 shows an example of a job management table 400 to be used by the job controller 306 for job management.

The job management table 400 is composed of a job table 410 for respectively managing a print job, and a job table managing table 420 for managing the job table 410. The job management table 400 is stored in the RAM 253 of the printer 202.

The job table 410 is composed of tables respectively corresponding to all the print jobs currently stored in the printer 202. Each table is composed of a usage flag 411 indicating whether the table is currently in use, a job ID 412 indicating the ID number of the job, a file name 413 representing the file name of the job in the file system, a previous job address 414 indicating the table of an immediately preceding job, a next job address 415 indicating a next job table, an interruption flag 416 indicating whether interruption is being executed, a resume page information 417 storing information for resuming the job in case interruption is executed, a suspension flag 418 indicating whether the job is temporarily suspended, and an owner ID 419 (for example a student number or an employee number) representing the user (owner of the present print job) executing the printing operation.

The job table managing table 420 is present for managing the job tables 410, and is composed of a top job address 421 indicating the table of a top job, a readout job address 422 indicating the table of a job currently in readout operation, and a last job address 423 indicating the table of a last job.

<Designation of Interruption Printing>

Figure 5:
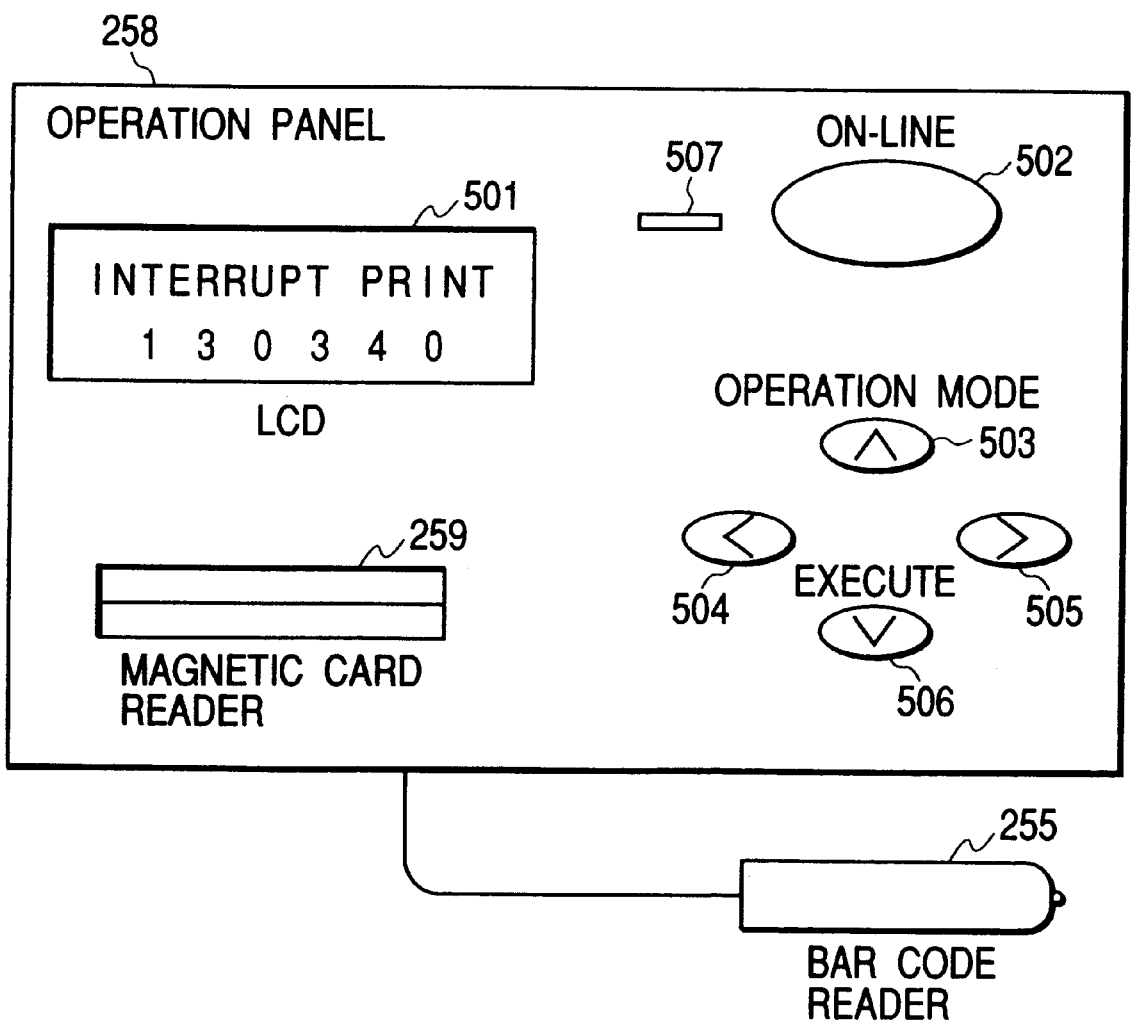
FIG. 5 is a view showing an example of an operation panel of the printer shown in FIG. 2.

FIG. 5 is a view showing an example of the operation panel 258 of the printer 202, wherein provided are an LCD display unit 501 for displaying various messages and information for operation, keys 502 to 506 for executing various operations on the printer, an LED display unit 507, a magnetic card reader 259 and a bar code reader 255.

In the present embodiment, the user can designate the interruption printing from the printer 202 in any of the following methods (A) to (C).

(A) By operating the keys of the operation panel 258, the user can cause the LCD display unit 501 to display the owner ID of a job which is currently stored in the printer 202 and can be designated for the interruption printing. The display shifts to the owner ID of a next job by depression of a leftward arrow key 504 or a rightward arrow key 505. The user of the printer can designate the interruption printing for a print job of the user, by selecting the ID number of the user and depressing an execution key 506.

(B) If the user of the printer has a magnetic card storing the owner ID number of the user, the user can notify the printer 202 of the owner ID of the print job desired for the interruption printing, by passing the magnetic card through the magnetic card reader 259 of the printer 202. When the magnetic card reader 259 reads the information of the magnetic card, the printer 202 searches the job tables 410 for a job of which the owner ID coincides with the owner ID in the magnetic card, and, if such job with coinciding owner ID is present, such job is processed by interruption printing.

(C) If the user of the printer has a card or the like bearing the owner ID number of the user by a bar code, the user can notify the printer 202 of the owner ID of the print job desired for the interruption printing, by causing the car code reader 27 of the printer 202 to read the card. When the bar code reader 27 reads the information, the printer 202 searches the job tables 410 for a job of which the owner ID coincides with the owner ID indicated by the bar code, and, if such job with coinciding owner ID is present, such job is processed by interruption printing.

Figure 10:
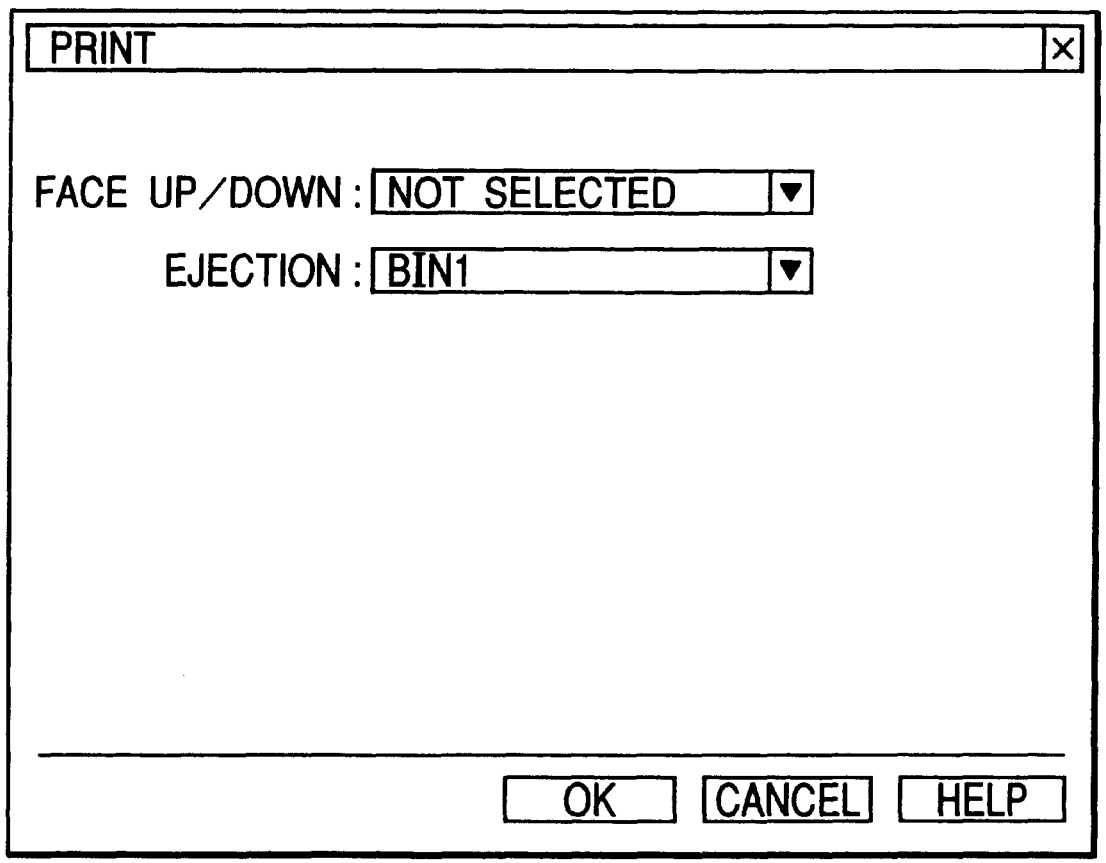

In addition, the user can designate the interruption printing by a utility software functioning on the host computer 200. FIGS. 10 and 11 show examples of the image displayed in case of designating the interruption printing of the print job from the utility softward.

Figure 9:
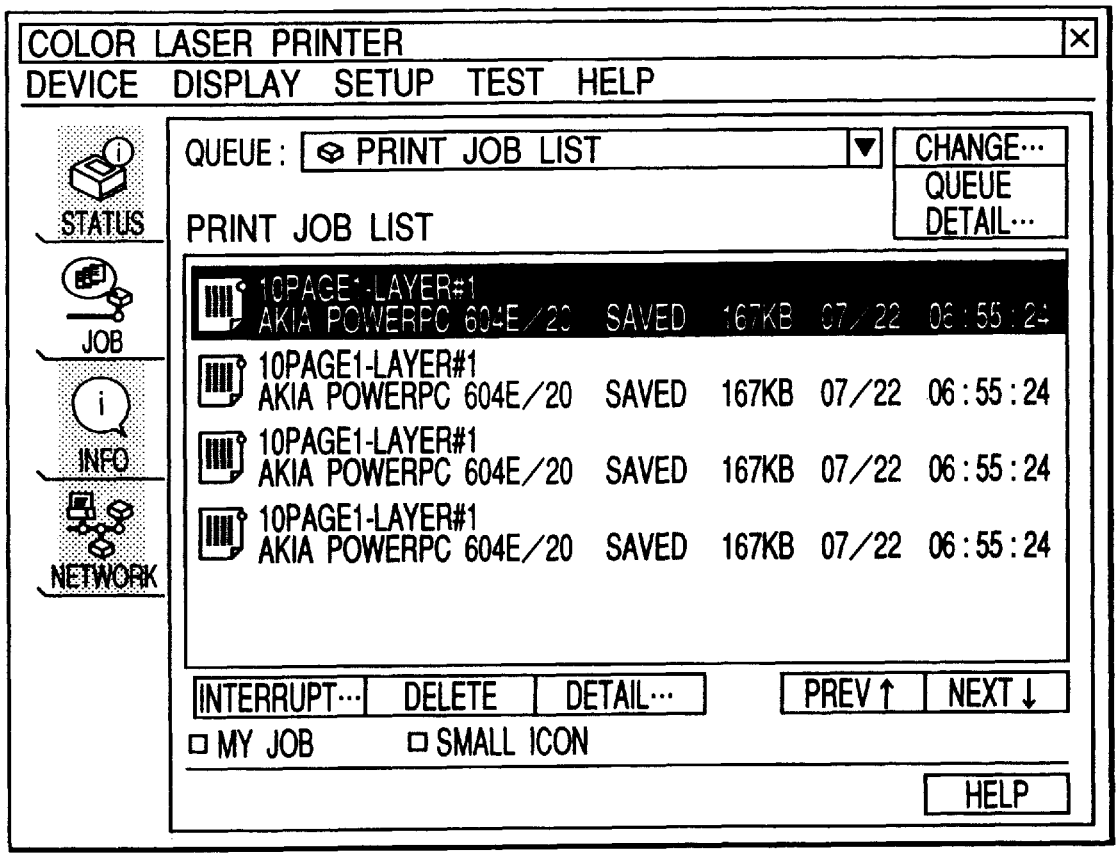
FIGS. 9 and 10 are views showing displayed images of a utility software.

At first, when the user selects the display of a print job list on the utility software, there is displayed an image as shown in FIG. 9. In this operation, the utility software transmits the job control data to the printer 202, in order to acquire the list of the print job. Thus, there can be acquired the information of the print jobs registered in the job management table 400.

When the user selects a print job desired for interruption printing from the list of the print jobs shown in FIG. 9 and depresses an "interrupt" button, there is displayed an image as shown in FIG. 10. On the image shown in FIG. 10, the user can change the sheet discharge method and the sheet discharge unit in the execution of the interruption printing of the print job. In the printer shown in FIG. 7, there can be designated a face-up bin 4010, a face-down bin 4020 or one of the bins BIN1 to BIN7 as the sheet discharge unit, and a face-up state or a face-down state can be designated as the sheet discharge method.

When the user depresses as "OK" button on the image shown in FIG. 10, a job interruption printing command is transmitted to the printer 202. This command contains the job ID of a print job designated for interruption. If the user designates the sheet discharge method and the sheet discharge unit for the print job, together with the designation of interruption printing of the print job, the information on the sheet discharge method and the sheet discharge unit is added to the above-mentioned command.

<Interruption Printing Process>

Figure 6:
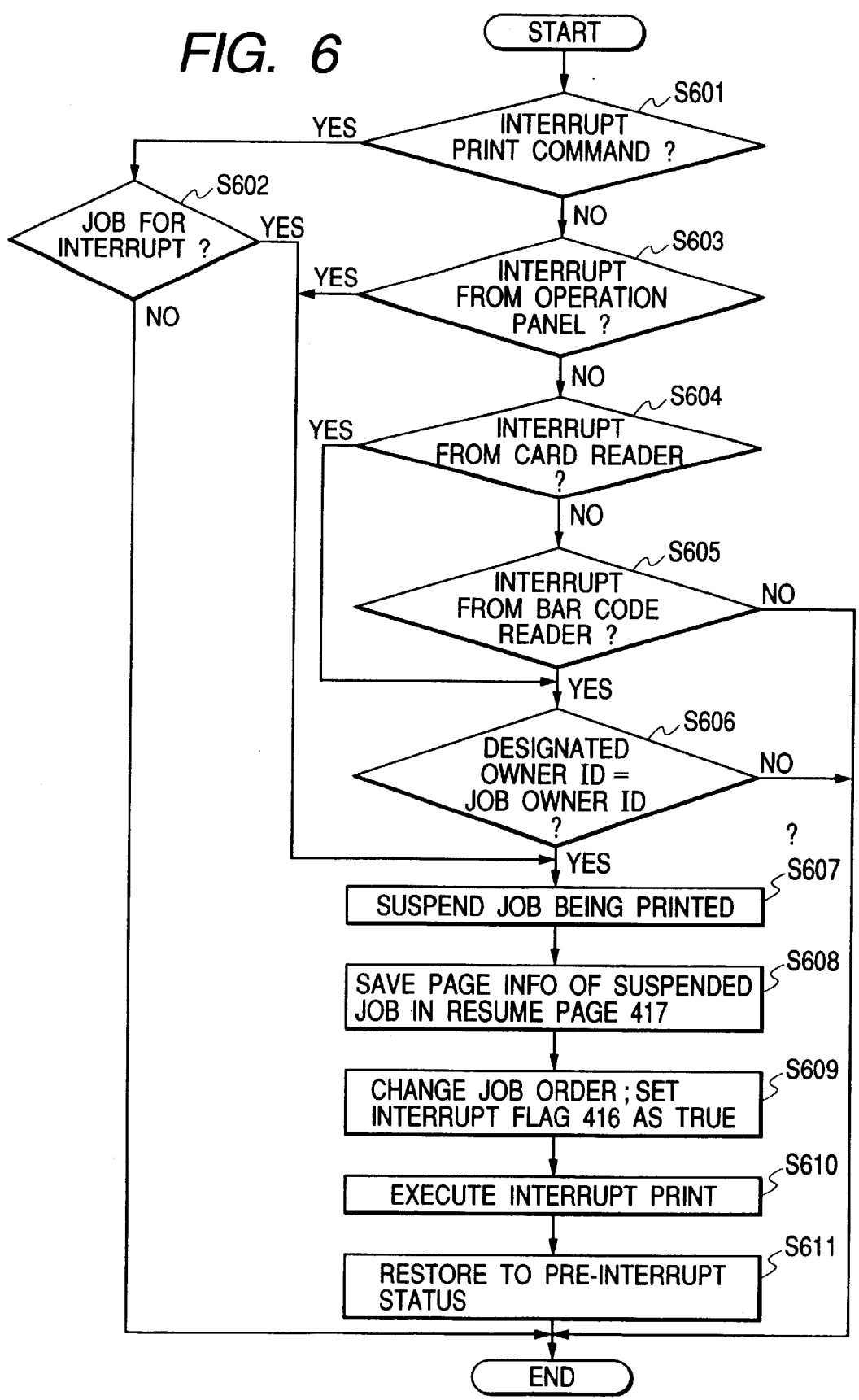
FIG. 6 is a flow chart showing an example of the data processing procedure in a print control apparatus of the present invention.

FIG. 6 is a flow chart showing an interruption printing process of the present invention. The job controller 306 executes the job interruption process according to a control program based on this way chart, wherein S601 to S611 indicate process steps.

At first the step S601 discriminates whether a command designating the interruption printing (job interruption printing command) is present. If present, the sequence proceeds to the step S602 for discriminating whether a job designated for interruption is present. If absent, the process is terminated. If present the sequence proceeds to the step S607 for initiating the actual interruption process.

On the other hand, if the step S601 identifies that the interruption print command is absent, the sequence proceeds to the step S603 for discriminating whether the owner ID of a job desired for interruption printing has been designated by the LCD display unit 501 and the key of the operation panel 258 of the printer 202. If the interruption has been designated from the operation panel 258, the sequence proceeds to the step S607, and if not, to the step S604.

The step S604 discriminates whether the interruption printing has been designated from the magnetic card reader 259, and the sequence proceeds to the step S606 if the interruption printing has been designated from the magnetic card reader, and to the step S605 if not.

The step S605 discriminates whether the interruption printing has been designated from the bar code reader 27, and, if designated, the sequence proceeds to the step S606, but, if not, the sequence is terminated because of absence of designation of any interruption printing.

The step S606 compares the owner ID read in the step S603, S604 or S605 with the owner ID 419 of each print job, thereby discriminating whether there is a print job of which the owner ID coincides with the designated owner ID. If there is present such print job of which the owner ID coincides with the designated owner ID, the sequence proceeds to the step S607, but, if such print job is absent, the process is terminated.

The actual interruption process is initiated from the step S607. The step S607 suspends the job currently in printing. The sequence does not proceed to the next stage unless the current printing operation is suspended.

Then the step S608 stores the information of a page of the suspended print job, at which the printing operation is to be resumed, in the resume page information 417 of the job table. The step S609 changes the order of the print jobs, by rearranging the links of the previous job address 414 and the next job address 415. More specifically, the top job address 421 is made to indicate the table of the print job designated for interruption. Then the next job address 415 of the table of the print job designated for interruption is made to indicate the table of the suspended print job. Further, the previous job address 414 of the table of the suspended print job is made to indicate the table of the print job designated for interruption printing. Finally, the interruption flag 416 of the print job designated for interruption print and of the suspended print job is set at "TRUE".

Then the step S610 executes the interruption printing of the job designated for interruption printing. After the interruption printing operation, various environmental settings are restored to a state prior to the interruption, whereupon the sequence is terminated.

<Sheet Discharge Unit for Interruption Print Job>

Figure 7:
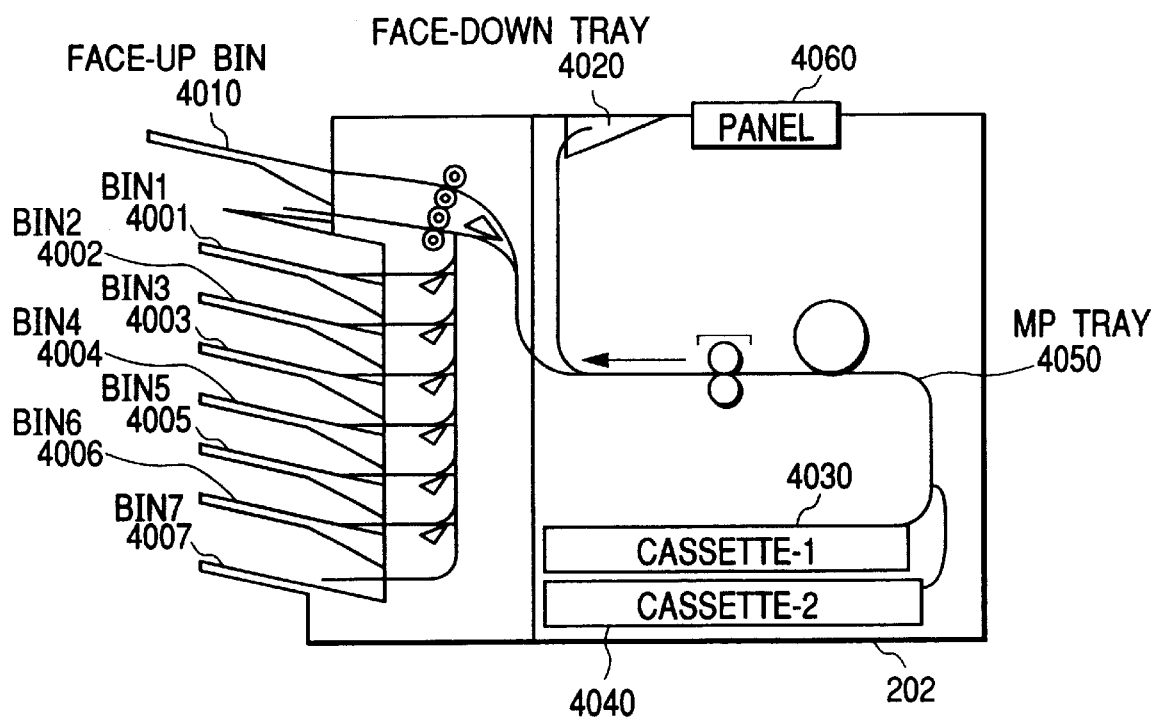
FIG. 7 is a schematic cross-sectional view showing the configuration of a printer constituting a 2nd embodiment of the print control apparatus of the present invention.

FIG. 7 is a schematic cross-sectional view of a printer of the present invention, having a 7-bin sorter and a face-up bin as the sheet discharge units. The sorter is so constructed as to be arbitrarily mountable as an optional equipment according to the object of use by the user.

In FIG. 7, the 7-bin sorter is provided with 1st to 7th bins 4001 to 4007 (BIN1 to BIN7), and the printer 202 can discharge the prints with sorting into these bins.

A face-up bin 4010 is provided for ace-up sheet discharge. A face-down tray 4020 is provided on the main body. Cassettes 4030, 4040 respectively contain sheets to be fed.

A multi-purpose (MP) tray 4050 is provided for feeding a sheet of non-standard format, a cardboard or an OHP film. An operation panel 4060 is provided for executing various operations.

If the suspended print job and the interruption print job utilize a same sheet discharge unit, the prints of the latter becomes present in the middle of the prints of the former. In such situation, the user is required an unnecessary work in sorting the prints for respective jobs. For this reason, different sheet discharge units are used respectively for the prints of the suspended print job and those of the interruption print job.

Also in case the interruption printing is designated in the course of print output to the sorter, there will result additional print outputs in the sorter if the output to the sorter is continued. Therefore, the face-up bin 4010 and the face-down tray 4020 are used as escape bins. If the sheets to be used in the interruption print job can be discharged in the face-down state, they are discharged to the face-down tray 4020, but, if they cannot be discharged in the face-down state, they are discharged to the face-up tray 4010. It is thus rendered possible to prevent that the prints of the interruption print job are mixed with those of the previous print job.

Also if the interruption process is executed by the interruption print command issued by the utility software, the sheet discharge unit is determined by the information on the sheet discharge method and the sheet discharge unit, attached to the command.

<Control Program>

In the following there will be explained, with reference to a memory map shown in FIG. 8, the configuration of a data processing program that can be read by the printing system in which the print control apparatus of the present invention is applicable.

FIG. 8 is a memory map of a memory medium storing various data processing programs that can be read by the printing system in which the print control apparatus of the present invention is applicable.

Though not illustrated, there may also be stored information for managing the programs stored in the memory medium, such as version information or producer information, and information dependent on the operating system of the program reading side, such as an icon for identifying the program.

Besides, data belonging to various programs are also managed by the above-mentioned directory. There may also be stored a program for installing various programs into the computer, or a thawing program if the program to be installed is compressed.

The functions of the foregoing embodiments, shown in FIG. 6, may be achieved by the host computer, according to a program to be installed from the exterior. The present invention is likewise applicable even if the information including the programs is supplied from an external memory medium such as a CD-ROM, a flush memory or a floppy disk to the output apparatus.

The objects of the present invention can naturally be attained also in a case where a memory medium storing the program codes of a software realizing the functions of the aforementioned embodiments is supplied to a system or an apparatus and the functions of the aforementioned embodiments are realized by a computer (CPU or MPU) of the above-mentioned system or apparatus by reading and executing the program codes stored in the memory medium.

In such case the program codes themselves of the software realize the novel functions of the present invention, and the memory medium storing the program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card, a ROM or an EEPROM.

The present invention also includes not only a case where the functions of the aforementioned embodiments are realized by the execution of the program codes read by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

What is claimed is:

1. A print control system including an information processing apparatus and a print control apparatus for receiving a print job and executing the received print job,
    wherein said print control apparatus comprises storing means for storing a plurality of print jobs received by said print control apparatus,
    wherein said information processing apparatus comprises;
        selection means for selecting a print job for printing from among the plurality of print jobs stored in said storing means;
        designation means for designating a sheet discharge destination of the stored print job selected by said selection means;
    and wherein said print control apparatus further comprises:
        first reception means for receiving, from said information processing apparatus, a command for changing the output order of the print jobs stored in said storing means and designating the print job selected by said selection means;
        second reception means for receiving, from said information processing apparatus, sheet discharge information designating the sheet discharge destination of the selected print job designated by said designation means; and
        job control means for, according to the command received by said first reception means, executing a second print job designated by the command by interrupting a first print job, and changing a sheet discharge destination of the second print job to the sheet discharge destination designated by the sheet discharge information received by said second reception means.

2. A print control system according to claim 1, further comprising:
    transmission means for transmitting list information indicating the received print jobs stored in said storing means to the information processing apparatus; and
    third reception means for receiving identification information for identifying a print job selected by the user from among the print jobs indicated by the list information,
    wherein the identification information received by third reception means is included in the command received by said first reception means and the second print job is a print job identified by the identification information.

3. A print control system according to claim 1, wherein the destination of sheet discharge includes a sorter unit.

4. A print control method of controlling a print control system including an information processing apparatus and a print control apparatus for receiving a print job and executing the received print job, said method comprising:
    a storing step of storing, in the print control apparatus, a plurality of print jobs received by the print control apparatus;
    a selecting step of selecting, in the information processing apparatus, a print job for printing from among the plurality of print jobs stored in said storing step;
    a designating step of designating, in the information processing apparatus, a sheet discharge destination of the stored print job selected in said selecting step;
    a first reception step of receiving, in the print control apparatus, from the information processing apparatus, a command for changing the output order of the print jobs stored in said storing step and designating the print job selected in said selecting step;
    a second reception step of receiving, in the print control apparatus, from the information processing apparatus, sheet discharge information designating the sheet discharge destination of the selected print job designed in said designating step; and
    a job control step of, in the print control apparatus, according to the received command, executing a second print job designated by the command by interrupting a first print job, and changing a sheet discharge designation of the second print job to the sheet discharge destination designated by the sheet discharge information received in said second reception step.

5. A print control method according to claim 4, further comprising:
    a transmission step of transmitting list information indicating the received print jobs stored in said storing step to the information processing apparatus; and
    a third reception step of receiving identification information for identifying a print job selected by the user from among the print jobs indicated by the list information,
    wherein the identification information received in said third reception step is included in the command received in said first reception step and the second print job is a print job identified by the identification information.

6. A print control method according to claim 4, wherein said method is adapted for a laser beam printer.

7. A print control method according to claim 4, wherein the print job is received from the information processing apparatus through a network.

8. A print control method according to claim 4, wherein the destination of sheet discharge includes a sorter unit.

9. A computer-readable memory medium storing a control program for controlling a print control system including an information processing apparatus, and a print control apparatus for receiving a print job and executing the received print job, the program comprising:

a storing step of storing, in the print control apparatus, a plurality of print jobs received by the print control apparatus;

a selection step of selecting, in the information processing apparatus, a print job for printing from among the plurality of print jobs stored in said storing step;

a designating step of designating, in the information processing apparatus, a sheet discharge destination of the stored print job selected in said selecting step;

a first reception step of receiving, in the print control apparatus, from the information processing apparatus, a command for changing the output order of the print jobs stored in said storing step and designating the print job selected in said selection step;

a second reception step of receiving, in the print control apparatus, from the information processing apparatus, sheet discharge information designating the sheet discharge destination of the selected print job designated in said designation step; and a job control step of, in the print control apparatus, according to the received command, to execute a second print job designated by the command by interrupting a first print job, and changing a sheet discharge destination of the second print job to the sheet discharge destination designated received in said second reception step.

10. A control program of controlling a print control system including an information processing apparatus and a print control apparatus for receiving a print job and executing the received print job, comprising:

a storing step of storing, in the print control apparatus, a plurality of print jobs received by the print control apparatus;

a selection step of selecting, in the information processing apparatus, a print job for printing from among the plurality of print jobs stored in said storing step;

a designating step of designating, in the information processing apparatus, a sheet discharge destination of the stored print job selected in said selecting step;

a first reception step of receiving, in the print control apparatus, from the information processing apparatus, a command for changing the output order of the print jobs stored in said storing step and designating the print job selected in said selecting step;

a second reception step of receiving, in the print control apparatus, from the information processing apparatus, sheet discharge information designating the sheet discharge destination of the selected print job designed in said designating step; and a job control step of, in the print control apparatus, according to the received command, executing a second print job designated by the command by interrupting a first print job, and changing a sheet discharge destination of the second print job to the sheet discharge destination designated by the sheet discharge information received in said second reception step.

11. A print control apparatus for receiving a print job and executing the received print job, comprising:

storing means for storing a plurality of received print jobs;

discrimination means for discriminating whether an instruction for changing the output order of the print jobs stored in said storing means and identification information for identifying an owner of a print job desired for printing are present; and job control means for, according to the instruction and the identification information, executing a second print job of an owner identical to the owner identified by the identification information by interrupting a first print job.

12. A print control apparatus according to claim 11, wherein the second print job is a print job of the owner identified by the identification information.

13. A print control apparatus according to claim 11, further comprising sheet discharge control means for changing a sheet discharge destination of the first print job and that of the second print job.

14. A print control system according to claim 13, wherein the sheet discharge destination includes a sorter unit.

15. A print control system according to claim 11, wherein the identification information is entered from a magnetic card reader.

16. A print control apparatus for receiving a print job and executing the received print job, comprising:

storing means for storing a plurality of received print jobs;

discrimination means for discriminating whether an instruction from a card reader connected to said print control apparatus for changing the output order of the print jobs stored in said storing means and identification information from a card reader connected to said print control apparatus are present; and job control means for, according to the instruction and the identification information, executing a second print job specified by the identification information entered together with the instruction by interrupting a first print job.

17. A print control apparatus for receiving a print job and executing the received print job, comprising:

storing means for storing a plurality of received print jobs;

discrimination means for discriminating whether an instruction from a bar code reader connected to said print control apparatus for changing the output order of the print jobs stored in said storing means and identification information from a bar code reader connected to said print control apparatus are present; and job control means for, according to the instruction and the identification information, executing a second print job specified by identification information entered together with the instruction by interrupting a first print job.

18. A print control method for receiving a print job and executing the received print job, comprising the steps of:

storing a plurality of received print jobs;

discriminating whether an instruction for changing the output order of the print jobs stored in said storing step and identification information for identifying an owner of a print job desired for printing are present; and according to the instruction and the identification information, executing a second print job of an owner identical to the owner identified by the identification information by interrupting a first print job.

19. A print control method according to claim 18, wherein the second print job is a print job of the owner identified by the identification information.

20. A print control method according to claim 18, further comprising a sheet discharge control step of changing the sheet discharge destination of the first print job and that of the second print job.

21. A print control method for receiving a print job and executing the received print job, comprising the steps of:

storing a plurality of received print jobs;

discriminating whether an instruction from a card reader connected to a print control apparatus that is executing said method for changing the output order of the print jobs stored in said storing step and identification information from a card reader connected to said print control apparatus are present; and according to the instruction and the identification information, executing a second print job specified by the identification information entered together with the instruction by interrupting a first print job.

22. A print control method for receiving a print job and executing the received print job, comprising the steps of:

storing a plurality of received print jobs;

discriminating whether an instruction from a bar code reader connected to the print control apparatus that is executing said method for changing the output order of the print jobs stored in said storing means and identification information from a bar code reader connected to said print control apparatus are present; and according to the instruction and the identification information, executing a second print job specified by the identification information entered together with the instruction by interrupting a first print job.

23. A computer-readable memory medium storing instructions for performing a print control method for receiving a print job and executing the received print job, comprising the steps of:

storing a plurality of received print jobs;

discriminating whether an instruction for changing the output order of the print jobs stored in said storing step and identification information for identifying an owner of a print job desired for printing are present; and according to the instruction, and the identification information, executing a second print job of an owner identical to the owner identified by the identification information by interrupting a first print job.

24. A computer-readable memory medium storing instructions for performing a print control method for receiving a print job and executing the received print job, comprising the steps of:

storing a plurality of received print jobs;

discriminating whether an instruction from a card reader connected to a print control apparatus that is executing said method for changing the output order of the print jobs stored in said storing step and identification information from a card reader connected to said print control apparatus are present; and according to the instruction and the identification information, executing a second print job specified by the identification information entered together with the instruction by interrupting a first print job.

25. A computer-readable memory medium storing instructions for performing a print control method for receiving a print job and executing the received print job, said method comprising the steps of:

storing a plurality of received print jobs;

discriminating whether an instruction from a bar code reader connected to the print control apparatus that is executing said method for changing the output order of the print jobs stored in said storing means and identification information from a bar code reader connected to said print control apparatus are present; and according to the instruction and the identification information, executing a second print job specified by the identification information entered together with the instruction by interrupting a first print job.

26. A control program for performing a print control method for receiving a print job and executing the received print job, comprising the steps of:

storing a plurality of received print jobs;

discriminating whether an instruction for changing the output order of the print jobs stored in said storing step and identification information for identifying an owner of a print job desired for printing are present; and according to the instruction and the identification information, executing a second print job of an owner identical to the owner identified by the identification information by interrupting a first print job.

27. A control program according to claim 26, wherein the second print job is a print job of the owner identified by the identification information.

28. A control program according to claim 26, further comprising a sheet discharge control step of changing the sheet discharge destination of the first print job and that of the second print job.

29. A control program for performing a print control method for receiving a print job and executing the received print job, comprising the steps of:

storing a plurality of received print jobs;

discriminating whether an instruction from a card reader connected to a print control apparatus that is executing said method for changing the output order of the print jobs stored in said storing step and identification information from a card reader connected to said print control apparatus are present; and according to the instruction and the identification information, executing a second print job specified by the identification information entered together with the instruction by interrupting a first print job.

30. A control program for performing a print control method for receiving a print job and executing the received print job, said method comprising the steps of:

storing a plurality of received print jobs;

discriminating whether an instruction from a bar code reader connected to the print control apparatus that is executing said method for changing the output order of the print jobs stored in said storing step and identification information from a bar code reader connected to said print control apparatus are present; and according to the instruction and the identification information, executing a second print job specified by the identification information entered together with the instruction by interrupting a first print job.

* * * * *

UNITED STATES PATENT AND TRADEMARK OFFICE
CERTIFICATE OF CORRECTION

PATENT NO. : 6,570,605 B1
APPLICATION NO. : 09/573550
DATED : May 27, 2003
INVENTOR(S) : Masami Kashiwazaki It is certified that error appears in the above-identified patent and that said Letters Patent is hereby corrected as shown below:

COLUMN 1

Line 18, "after wards" should read --afterwards--; and
Line 27, "Such" should read --Such a--.

COLUMN 3

Line 19, "to e used" should read --to be used--.

COLUMN 5

Line 23, "such" should read --such a--; and
        "after" should read --after being--.

COLUMN 9

Line 36, "comprises;" should read --comprises:--.

COLUMN 10

Line 5, "third" should read --said third--;
Line 33, "designed" should read --designated--;
Lines 56 and 57, Claim 6 should be deleted.
Lines 58 to 60, Claim 7 should be deleted.
Line 61, delete "8" and replace with --6--.
Line 63, delete "9" and replace with --7--.

COLUMN 11

Line 25, "designated received" should read --information received--.
Line 27, delete "10" and replace with --8--.
Line 58, delete "11" and replace with --9--.

COLUMN 12

Line 4, replace "12" and "11" with --10-- and --9--.
Line 7, delete "13" and "11" and replace with --11-- and --9--.
Line 11, replace "14" and "13" with --12-- and --11--.
Line 13, replace "15" and "11" with --13-- and --11--.
Line 16, replace "16" with --14--.
Line 30, replace "17" with --15--.
Line 44, replace "18" with --16--.

UNITED STATES PATENT AND TRADEMARK OFFICE
CERTIFICATE OF CORRECTION

PATENT NO. : 6,570,605 B1
APPLICATION NO. : 09/573550
DATED : May 27, 2003
INVENTOR(S) : Masami Kashiwazaki It is certified that error appears in the above-identified patent and that said Letters Patent is hereby corrected as shown below:

Line 56, replace "19" and "18" with --17-- and --16--.
Line 59, replace "20" and "18" with --18-- and --16--.
Line 63, replace "21" with --19--.

COLUMN 13

Line 9, replace "22" with --20--.
Line 23, replace "23" with --21--.
Line 36, replace "24" with --22--.
Line 52, replace "25" with --23--.

COLUMN 14

Line 9, replace "26" with --24--.
Line 21, replace "27" and "26" with --25-- and --24--.
Line 24, replace "28" and "26" with --26-- and --24--.
Line 28, replace "29" with --27--.
Line 43, replace "30" with --28--.

Signed and Sealed this

Thirteenth Day of May, 2008

JON W. DUDAS
*Director of the United States Patent and Trademark Office*